US008922052B2

(12) United States Patent  (10) Patent No.: US 8,922,052 B2
Takezawa  (45) Date of Patent: Dec. 30, 2014

(54) POWER SUPPLY DEVICE

(75) Inventor: Ryuichi Takezawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 6 days.

(21) Appl. No.: 13/825,690

(22) PCT Filed: May 18, 2012

(86) PCT No.: PCT/JP2012/062818
§ 371 (c)(1),
(2), (4) Date: Mar. 22, 2013

(87) PCT Pub. No.: WO2013/171900
PCT Pub. Date: Nov. 21, 2013

(65) Prior Publication Data
US 2013/0307332 A1    Nov. 21, 2013

(51) Int. Cl.
H02J 3/00       (2006.01)
H02M 3/335   (2006.01)
H02M 1/44     (2007.01)

(52) U.S. Cl.
CPC ...... H02M 3/33523 (2013.01); H02M 3/33561 (2013.01); H02M 1/44 (2013.01)
USPC .......................................................... 307/17

(58) Field of Classification Search
USPC ........................................ 307/11, 17, 19, 83
See application file for complete search history.

(56) References Cited

U.S. PATENT DOCUMENTS 6,064,291 A     5/2000  Urabe et al.
7,122,917 B2 *  10/2006  Pfister et al. ..................... 307/83

FOREIGN PATENT DOCUMENTS

| CN | 1210617 A | 3/1999 |
|----|-----------|--------|
| JP | 58-062714 A | 4/1983 |
| JP | 08-172772 A | 7/1996 |
| JP | 08-330150 A | 12/1996 |
| JP | 2000-233090 A | 8/2000 |
| JP | 2002-51554 A | 2/2002 |
| JP | 2010-183751 A | 8/2010 |

OTHER PUBLICATIONS

Korean Office Action (Notice of Preliminary Rejection) mailed Feb. 17, 2014, Patent Application No. 10-2013-7007050.
Korean Office Action (Reasons for Rejection) mailed Aug. 29, 2014, Patent Application No. 10-2013-7007050.
Chinese Office Action, issued Sep. 2, 2014, Application No. 2012800030576.

* cited by examiner

Primary Examiner — Carlos Amaya
(74) Attorney, Agent, or Firm — Sughrue Mion, PLLC (57) ABSTRACT

A power supply device generating source powers to be outputted to an inverter and external supply destinations includes: a first power supply transformer including a first primary winding and a plurality of first secondary windings wound on an outer side of the first primary winding; and a second power supply transformer including a second primary winding electrically connected to one of the first secondary windings and a plurality of second secondary windings wound on an outer side of the second primary winding. The second secondary windings are connected to the external supply destinations. The first secondary windings include an upper gate winding connected to an upper-gate power supply circuit for switching on and off a switching element of an upper arm of the inverter, and the upper gate winding is wound on an outermost side to be separated away from the one of the first secondary windings.

4 Claims, 5 Drawing Sheets

POWER SUPPLY DEVICE

CROSS REFERENCE TO RELATED APPLICATIONS

This application is a National Stage of International Application No. PCT/JP2012/062818 filed May 18, 2012, the contents of all of which are incorporated herein by reference in their entirety.

FIELD

The present invention relates to a power supply device.

BACKGROUND

A power supply device that receives an alternate-current power from an external power supply and generates a plurality of source powers has been conventionally known.

Patent Literature 1 describes a DC-DC converter including an overcurrent protection transistor that protects a switching transistor on an input side of a switching transformer from an overcurrent, in which a protection-circuit driving power for turning the overcurrent protection transistor on is generated from an electromotive force of a control winding on the input side of the switching transformer. With this configuration according to Patent Literature 1, the switching transformer is reduced in size because the switching transformer needs one winding fewer than in a case where a winding for outputting a protection-circuit driving power is provided on an output side of the switching transformer to output the protection-circuit driving power from that output-side winding.

CITATION LIST

Patent Literature

Patent Literature 1: Japanese Patent Application Laid-open No. 2000-233090

SUMMARY

Technical Problem

In the technique described in Patent Literature 1, in the switching transformer, it is considered that a winding that outputs an upper arm power for supplying a base current to an upper-side transistor of a motor driver is wound adjacent to a winding that outputs a power open to a user. Therefore, noise (switching noise) generated by a switching operation of the upper-side transistor (an upper-arm switching element) of the motor driver is transferred from the winding that outputs the upper arm power to the winding that outputs the power open to the user, which may cause a device at an output destination of the power open to the user (an external supply destination) to malfunction.

The present invention has been achieved in view of the above circumstances, and an object of the present invention is to provide a power supply device that can suppress transfer of switching noise caused by a switching element of an upper arm to an external supply destination.

Solution to Problem

In order to the above-mentioned problems and achieve the object, a power supply device according to one aspect of the invention is a power supply device that generates source powers to be outputted to an inverter and a plurality of external supply destinations, the power supply device comprising: a first power supply transformer including a first primary winding and a plurality of first secondary windings wound on an outer side of the first primary winding; and a second power supply transformer including a second primary winding electrically connected to one of the first secondary windings and a plurality of second secondary windings wound on an outer side of the second primary winding, wherein the second secondary windings are connected to the external supply destinations, and the first secondary windings include an upper gate winding connected to an upper-gate power supply circuit for switching on and off a switching element of an upper arm of the inverter, the upper gate winding being wound on an outermost side to be separated away from the one of the first secondary windings.

Advantageous Effects of Invention

According to the present invention, in the winding structure of the first power supply transformer, one of the first secondary windings and the upper gate winding can be separated off from each other. Therefore, it is possible to prevent switching noise from being easily transferred from the upper gate winding to the one of the first secondary windings, thereby preventing the switching noise from being easily transferred to the external supply destinations via the one of the first secondary windings. Accordingly, transfer of the switching noise caused by the switching element of the upper arm to the external supply destinations can be suppressed.

DESCRIPTION OF EMBODIMENTS

Embodiments of a power supply device according to the present invention will be described below in detail with reference to the drawings. The present invention is not limited to these embodiments.

Embodiment

Figure 3:
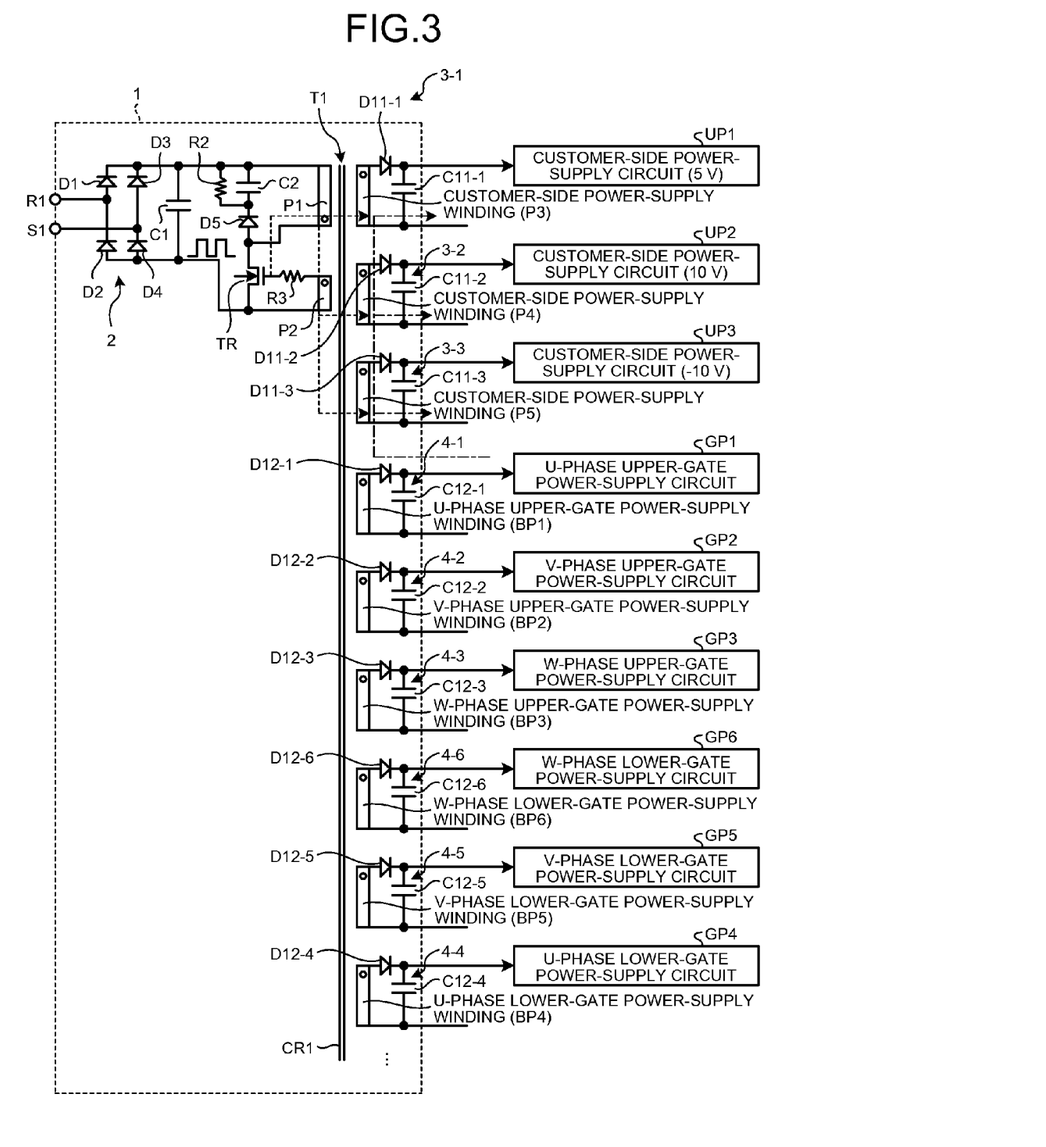
FIG. 3 is a diagram showing a configuration of a power supply device according to a fundamental form.
Figure 4:
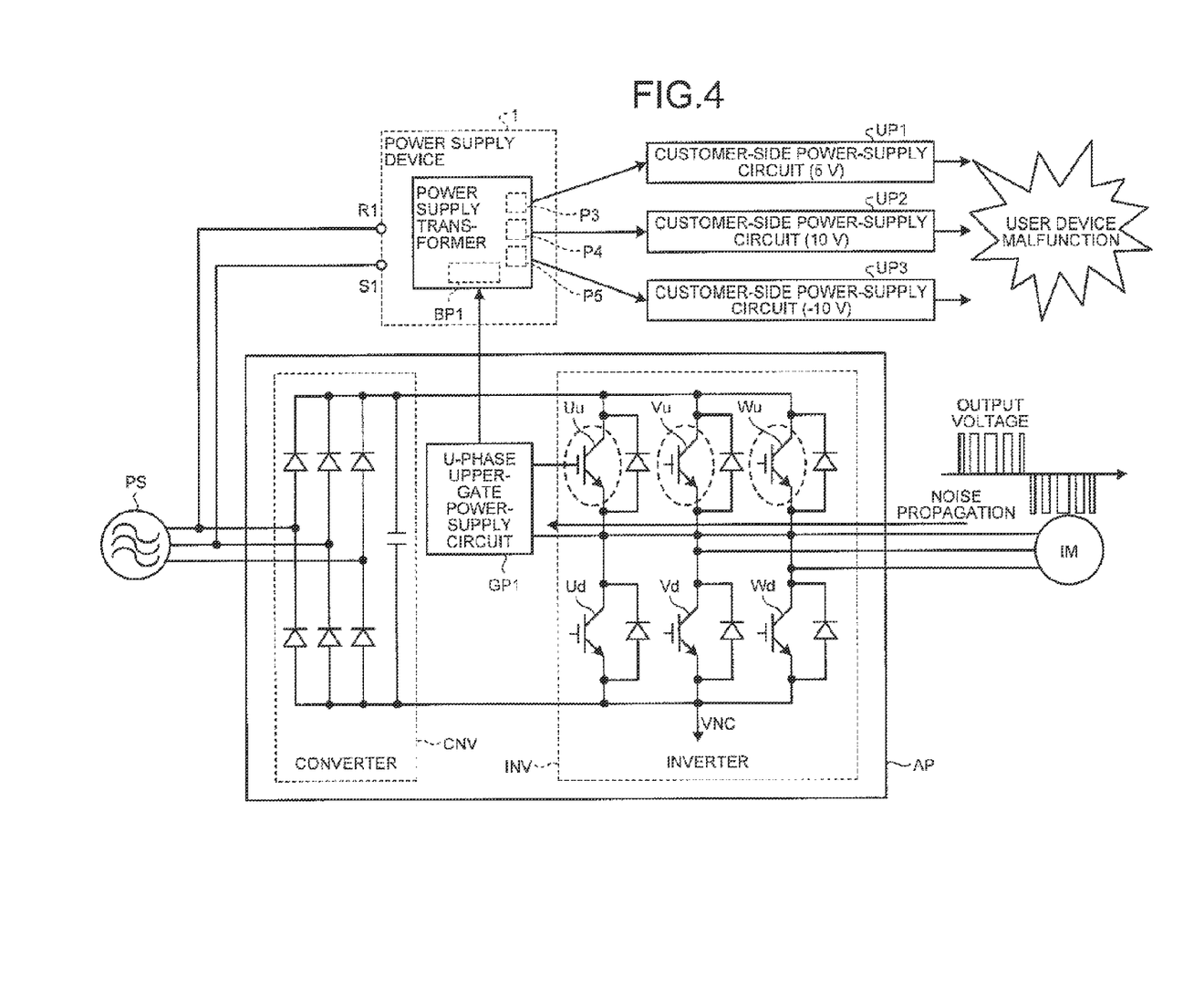
FIG. 4 is a diagram showing a configuration of a system to which the power supply device according to the fundamental form is applied.

Before explaining a power supply device 100 according to an embodiment, a power supply device 1 according to a fundamental form is explained with reference to FIGS. 3 and 4. FIG. 3 depicts a configuration of the power supply device 1 according to the fundamental form. FIG. 4 depicts a configuration of a system to which the power supply device 1 according to the fundamental form is applied.

The power supply device 1 receives an alternate-current power from an external power supply PS, generates a plurality of source powers (for example, direct-current powers) from the received alternate-current power, and supplies the generated source powers to an inverter INV and a plurality of customer-side power-supply circuits (a plurality of external supply destinations) UP1 to UP3. For example, the inverter INV is a general-purpose inverter, which is provided in an inverter device AP. In the inverter device AP, the alternate-current power received from the external power supply PS is converted into a direct-current power by a converter CNV, the direct-current power is converted into an alternate-current power by the inverter INV, and the obtained alternate-current power is supplied to a motor IM to drive the motor IM. For example, the customer-side power-supply circuits UP1 to UP3 are power supply circuits used in user devices.

Specifically, the power supply device 1 includes a power supply transformer T1, an input circuit 2, and a plurality of output circuits 3-1 to 3-3 and 4-1 to 4-6.

The power supply transformer T1 receives a direct-current power from the input circuit 2, transforms (for example, boosts) the received direct-current power at, for example, a plurality of transformation ratios, and supplies the direct-current powers obtained by the transformation to the output circuits 3-1 to 3-3 and 4-1 to 4-6.

Figure 5:
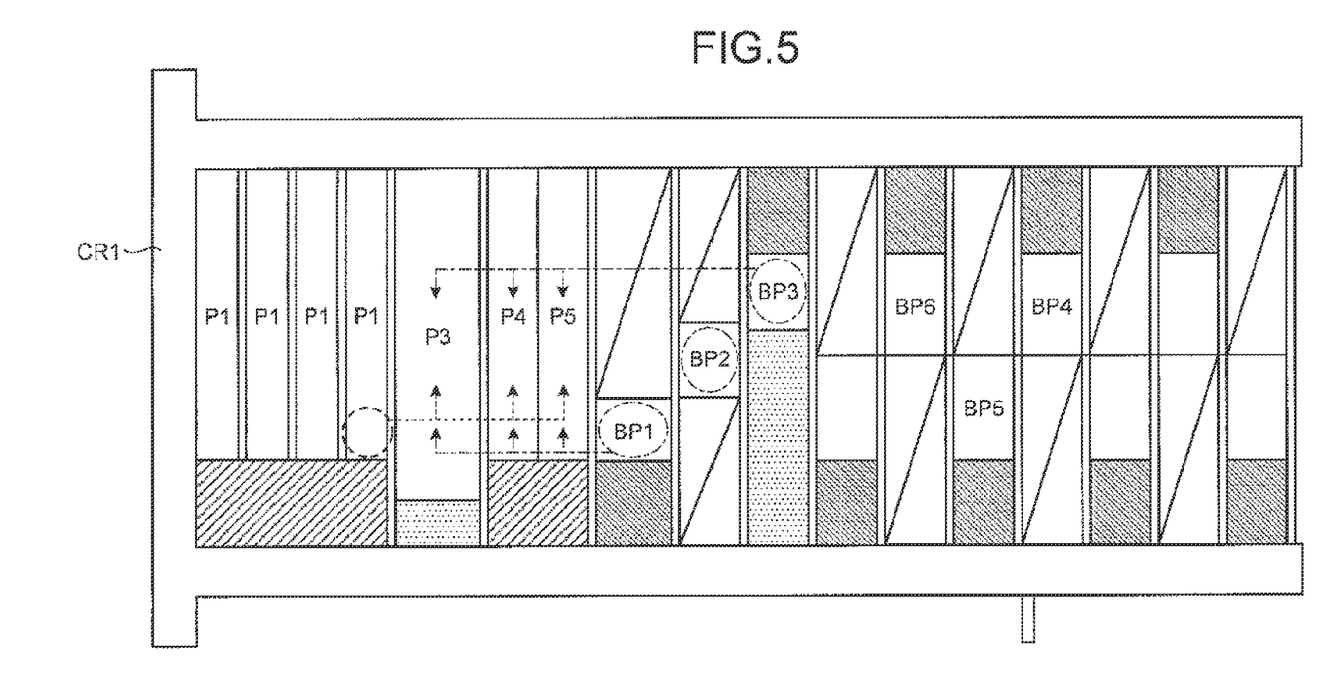
FIG. 5 is an illustration showing a winding structure of a power supply transformer in the fundamental form.

The power supply transformer T1 includes a core CR1, a primary winding P1, a plurality of secondary windings P3 to P5 and BP1 to BP6, and a control winding P2. As shown in FIG. 5, in the power supply transformer T1, the primary winding P1 is wound on an outer side of the core CR1, and the secondary windings P3 to P5 and BP1 to BP6 are wound on an outer side of the primary winding P1.

In the following explanations, the secondary windings P3 to P5 and BP1 to BP6 are also referred to by names indicating their respective supply destinations, that is, as a customer-side power-supply winding P3, a customer-side power-supply winding P4, a customer-side power-supply winding P5, a U-phase upper gate winding BP1, a V-phase upper gate winding BP2, a W-phase upper gate winding BP3, a U-phase lower gate winding BP4, a V-phase lower gate winding BP5, and a W-phase lower gate winding BP6, respectively. The U-phase upper gate winding BP1, the V-phase upper gate winding BP2 and the W-phase upper gate winding BP3 are also collectively referred to as upper gate windings BP1 to BP3, and the U-phase lower gate winding BP4, the V-phase lower gate winding BP5 and the W-phase lower gate winding BP6 are also collectively referred to as lower gate windings BP4 to BP6.

FIG. 5 depicts a winding structure of the power supply transformer T1 in the power supply device 1. In FIG. 5, the left side of the landscape figure indicates an inner side (the core CR1 side) and the right side of the figure indicates an outer side (the opposite side to the core CR1) and, in FIG. 3, in the form of corresponding to the configuration shown in FIG. 5, the upper side of the portrait figure indicates the inner side and the lower side of the figure indicates the outer side. That is, as shown in FIGS. 3 and 5, the customer-side power-supply winding P3, the customer-side power-supply winding P4, the customer-side power-supply winding P5, the U-phase upper gate winding BP1, the V-phase upper gate winding BP2, the W-phase upper gate winding BP3, the W-phase lower gate winding BP6, the V-phase lower gate winding BP5, and the U-phase lower gate winding BP4 are wound in this order on the outer side of the primary winding P1.

The input circuit 2 converts the alternate-current power received from the external power supply PS into a direct-current power, and supplies the direct-current power obtained by the conversion to the power supply transformer T1. For example, in the input circuit 2, a two-phase (R-phase and S-phase) alternate-current power is received at input terminals R1 and S1, the received alternate-current power is rectified by a plurality of diodes D1 to D4 connected in a bridge configuration to generate a direct-current power, and the generated direct-current power is smoothed by a capacitor C1. The smoothed direct-current power is transferred to the primary winding P1 of the power supply transformer T1 via a resistor R2, a capacitor C2, a diode D5 and a transistor TR. The transistor TR is switched on and off in response to a power (voltage) received at its gate from the control winding P2 via a resistor R3.

The output circuits 3-1 to 3-3 and 4-1 to 4-6 correspond to the secondary windings P3 to P5 and BP1 to BP6, respectively. The output circuits 3-1 to 3-3 supply direct-current powers transferred from the secondary windings P3 to P5 to the customer-side power-supply circuits UP1 to UP3, respectively, and the output circuits 4-1 to 4-6 supply direct-current powers transferred from the secondary windings BP1 to BP6 to a plurality of gate power-supply circuits GP1 to GP6, respectively.

In the following explanations, the gate power-supply circuits GP1 to GP6 are also referred to by names for identifying their respective supply destinations, that is, as a U-phase upper-gate power-supply circuit GP1, a V-phase upper-gate power-supply circuit GP2, a W-phase upper-gate power-supply circuit GP3, a U-phase lower-gate power-supply circuit GP4, a V-phase lower-gate power-supply circuit GP5, and a W-phase lower-gate power-supply circuit GP6. The U-phase upper-gate power-supply circuit GP1, the V-phase upper-gate power-supply circuit GP2 and the W-phase upper-gate power-supply circuit GP3 are also collectively referred to as upper-gate power-supply circuits GP1 to GP3, and the U-phase lower-gate power-supply circuit GP4, the V-phase lower-gate power-supply circuit GP5 and the W-phase lower-gate power-supply circuit GP6 are also collectively referred to as lower-gate power-supply circuits GP4 to GP6.

For example, the output circuit 3-1 includes a capacitor C11-1 connected to the customer-side power-supply winding P3 via a diode D11-1, and outputs the direct-current power transferred from the customer-side power-supply winding P3 to the customer-side power-supply circuit UP1 while maintaining the direct-current power in the capacitor C11-1. The output circuit 3-2 includes a capacitor C11-2 connected to the customer-side power-supply winding P4 via a diode D11-2, and outputs the direct-current power transferred from the customer-side power-supply winding P4 to the customer-side power-supply circuit UP2 while maintaining the direct-current power in the capacitor C11-2. The output circuit 3-3 includes a capacitor C11-3 connected to the customer-side power-supply winding P5 via a diode D11-3, and outputs the direct-current power transferred from the customer-side power-supply winding P5 to the customer-side power-supply circuit UP3 while maintaining the direct-current power in the capacitor C11-3. With this configuration, one or more user devices are operated with a source power from the customer-side power-supply circuit UP1 (for example, a power including a voltage of 5V), a source power from the customer-side power-supply circuit UP2 (for example, a power including a voltage of 10V), and a source power from the customer-side power-supply circuit UP3 (for example, a power including a voltage of −10V).

For example, the output circuit 4-1 includes a capacitor C12-1 connected to the U-phase upper gate winding BP1 via a diode D12-1, and outputs the direct-current power transferred from the U-phase upper gate winding BP1 to the U-phase upper-gate power-supply circuit GP1 while maintaining the direct-current power in the capacitor C12-1. The output circuit 4-2 includes a capacitor C12-2 connected to the V-phase upper gate winding BP2 via a diode D12-2, and outputs the direct-current power transferred from the V-phase upper gate winding BP2 to the V-phase upper-gate power-supply circuit GP2 while maintaining the direct-current power in the capacitor C12-2. The output circuit 4-3 includes a capacitor C12-3 connected to the W-phase upper gate winding BP3 via a diode D12-3, and outputs the direct-current power transferred from the W-phase upper gate winding BP3 to the W-phase upper-gate power-supply circuit GP3 while maintaining the direct-current power in the capacitor C12-3. With this configuration, the U-phase upper-gate power-supply circuit GP1, the V-phase upper-gate power-supply circuit GP2, and the W-phase upper-gate power-supply circuit GP3 make switching operations for switching on and off switching elements Uu, Vu and Wu (see FIG. 4) of an upper arm of the inverter INV, respectively, under control of a control circuit (not shown).

For example, the output circuit 4-6 includes a capacitor C12-6 connected to the W-phase lower gate winding BP6 via a diode D12-6, and outputs the direct-current power transferred from the W-phase lower gate winding BP6 to the W-phase lower-gate power-supply circuit GP6 while maintaining the direct-current power in the capacitor C12-6. The output circuit 4-5 includes a capacitor C12-5 connected to the V-phase lower gate winding BP5 via a diode D12-5, and outputs the direct-current power transferred from the V-phase lower gate winding BP5 to the V-phase lower-gate power-supply circuit GP5 while maintaining the direct-current power in the capacitor C12-5. The output circuit 4-4 includes a capacitor C12-4 connected to the U-phase lower gate winding BP4 via a diode D12-4, and outputs the direct-current power transferred from the U-phase lower gate winding BP4 to the U-phase lower-gate power-supply circuit GP4 while maintaining the direct-current power in the capacitor C12-4. With this configuration, the W-phase lower-gate power-supply circuit GP6, the V-phase lower-gate power-supply circuit GP5, and the U-phase lower-gate power-supply circuit GP4 make switching operations for switching on and off switching elements Wd, Vd and Ud (see FIG. 4) of a lower arm of the inverter INV, respectively, under control of the control circuit (not shown).

With this configuration, switching noise may be generated by the switching operations of the switching elements Uu, Vu and Wu of the upper arm of the inverter INV, and the generated switching noise may affect other devices via various paths.

For example, as shown in FIGS. 3 and 4, the switching noise is transferred (propagated) to the upper-gate power-supply circuits GP1 to GP3, the output circuits 4-1 to 4-3, and the upper gate windings BP1 to BP3. At that time, in the power supply transformer T1, because the upper gate windings BP1 to BP3 are wound adjacent to the customer-side power-supply windings P3 to P5 as shown in FIG. 5, the switching noise transferred to the upper gate windings BP1 to BP3 tends to be further transferred (propagated) to the customer-side power-supply windings P3 to P5. The switching noise is then easy to transfer (propagate) to the customer-side power-supply circuits UP1 to UP3 via the output circuits 3-1 to 3-3, and therefore there is a possibility of causing one or more user devices operated using the source powers from the customer-side power-supply circuits UP1 to UP3 to malfunction.

To deal with this problem, measures can be provided by a passive filter (common mode reactor or primary filter). However, when the passive filter is provided for the measures, the power supply device is increased in size, which makes it difficult to install the power supply device in a limited space.

According to the present embodiment, in the power supply device 100, easy transfer of the switching noise from the upper gate windings to the customer-side power-supply windings is prevented by providing a duplexed form of power supply transformer to reduce the number of the customer-side power-supply windings in a power supply transformer of a first stage and winding the upper gate windings on the outermost side to be away from the customer-side power-supply windings.

Figure 1:
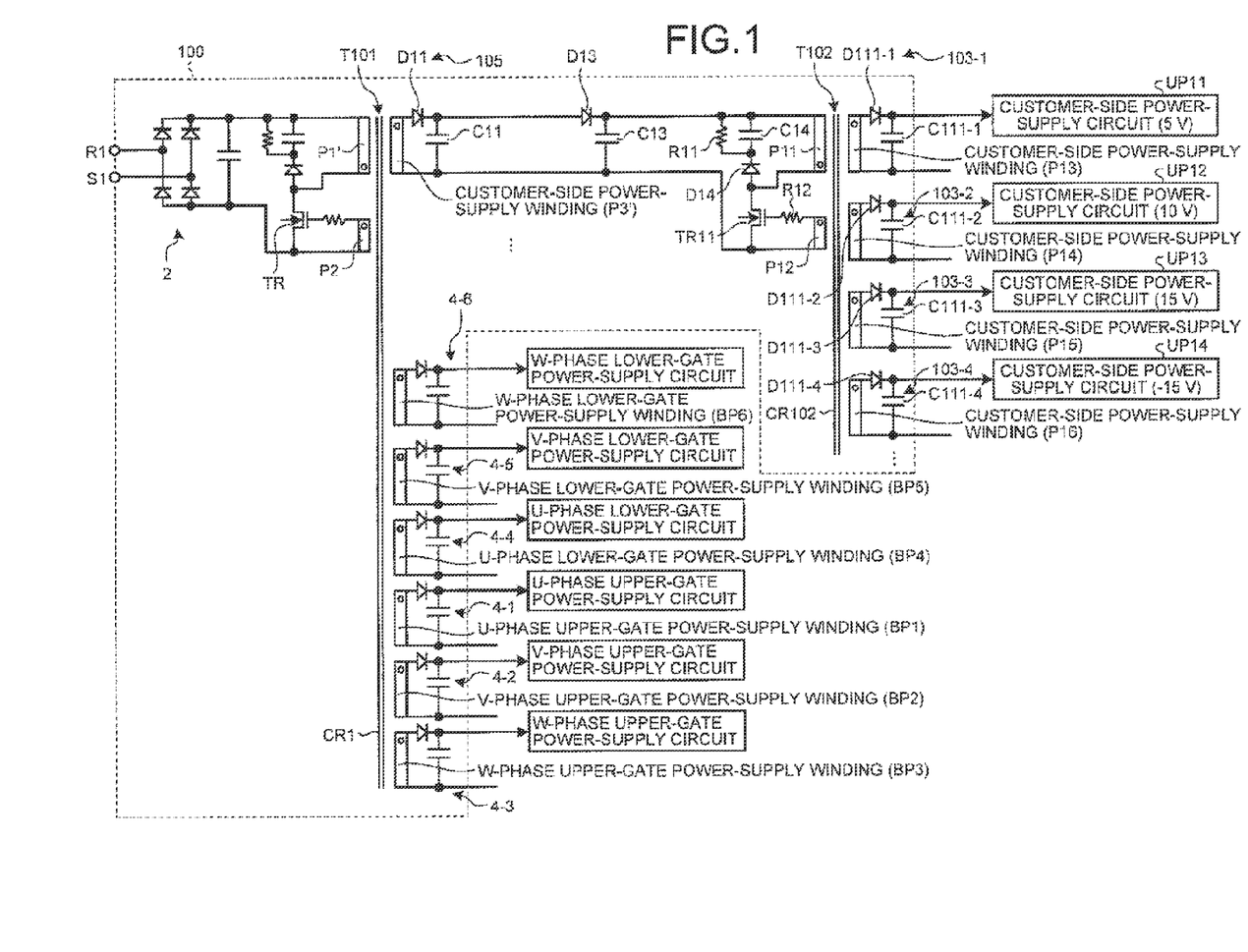
FIG. 1 is a diagram showing a configuration of a power supply device according to an embodiment.

Specifically, as shown in FIG. 1, the power supply device 100 includes a power supply transformer (first power supply transformer) T101, a power supply transformer (second power supply transformer) T102, a relay circuit 105, and output circuits 103-1 to 103-4, instead of the power supply transformer T1 and the output circuits 3-1 to 3-3. FIG. 1 depicts the configuration of the power supply device 100.

The power supply transformer T101 receives the direct-current power from the input circuit 2, transforms (for example, boosts) the received direct-current power at, for example, plural transformation ratios, and supplies the direct-current powers obtained by the transformation to the relay circuit 105 and the output circuits 4-1 to 4-6.

The power supply transformer T101 includes the core CR1, a primary winding (first primary winding) P1', a plurality of secondary windings (a plurality of first secondary windings) P3' and BP1 to BP6, and the control winding P2. In the power supply transformer T101, as shown in FIG. 2, the primary winding P1' is wound on an outer side of the core CR1, and the secondary windings P3' and BP1 to BP6 are wound on an outer side of the primary winding P1'.

Figure 2:
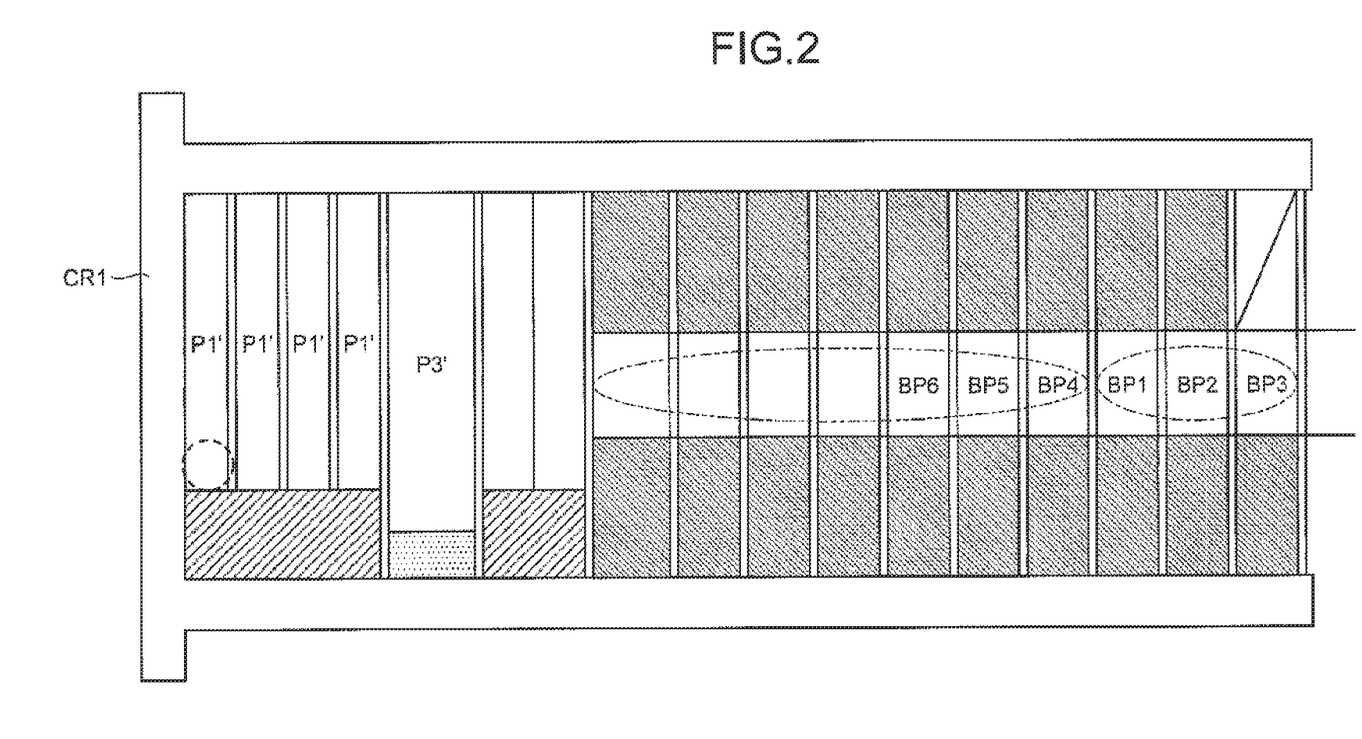
FIG. 2 is an illustration showing a winding structure of a power supply transformer according to the embodiment.

FIG. 2 depicts a winding structure of the power supply transformer T101 in the power supply device 100. In FIG. 2, the left side of the landscape figure indicates an inner side (the core CR1 side) and the right side of the figure indicates an outer side (the opposite side to the core CR1), and, in FIG. 1, in the form of corresponding to the configuration shown in FIG. 2, the upper side of the landscape figure indicates the inner side and the lower side of the figure indicates the outer side. That is, as shown in FIGS. 1 and 2, a customer-side power-supply winding P3', a plurality of predetermined windings, the W-phase lower gate winding BP6, the V-phase lower gate winding BP5, the U-phase lower gate winding BP4, the U-phase upper gate winding BP1, the V-phase upper gate winding BP2, and the W-phase upper gate winding BP3 are wound in this order on the outer side of the primary winding P1'.

In the primary winding P1', a plurality of layers are wound in such a manner that a winding start layer among the layers is located on the innermost side. A location indicated by a dashed circle in FIG. 2 is a winding start location.

In the secondary windings P3' and BP1 to BP6, the number of the customer-side power-supply windings is reduced to one, that is one customer-side power-supply winding P3', and the single customer-side power-supply winding P3' is wound on the innermost side while the upper gate windings BP1 to BP3 are wound on the outermost side. Furthermore, in the secondary windings P3' and BP1 to BP6, the lower gate windings BP4 to BP6 are wound between the upper gate windings BP1 to BP3 and the customer-side power-supply winding P3' to have substantially the same height in an axial direction as that of the upper gate windings BP1 to BP3.

The power supply transformer T102 receives the direct-current power from the power supply transformer T101 via the relay circuit 105, transforms (for example, boosts) the received direct-current power at, for example, plural transformation ratios, and supplies the direct-current powers obtained by the transformation to the output circuits 103-1 to 103-4.

The power supply transformer T102 includes a core CR102, a primary winding P11, a plurality of secondary windings P13 to P16, and a control winding P12. The primary winding P11 is electrically connected to the customer-side power-supply winding P3' via the relay circuit 105. In the power supply transformer T102, the primary winding P11 is wound on an outer side of the core CR102, and the secondary windings P13 to P16 are wound on an outer side of the primary winding P11 (see FIG. 2).

The relay circuit 105 supplies the direct-current power transferred from the single customer-side power-supply winding P3' to the power supply transformer T102. For example, in the relay circuit 105, the direct-current power transferred from the customer-side power-supply winding P3' via a diode D11 is maintained in a capacitor C11, and the direct-current power transferred from the capacitor C11 via a diode D13 is maintained in a capacitor C13. The direct-current power maintained in the capacitor C13 is transferred to the primary winding P11 of the power supply transformer T102 via a resistor R11, a capacitor C14, a diode D14, and a transistor TR11. The transistor TR11 is switched on and off in response to a power (voltage) received at its gate from the control winding P12 via a resistor R12.

The output circuits 103-1 to 103-4 correspond to the secondary windings P13 to P16, respectively. The output circuits 103-1 to 103-4 supply direct-current powers transferred from the secondary windings P13 to P16 to a plurality of customer-side power-supply circuits UP11 to UP14, respectively. With this configuration, one or plural user devices are operated with a source power from the customer-side power-supply circuit UP11 (for example, a power including a voltage of 5V), a source power from the customer-side power-supply circuit UP12 (for example, a power including a voltage of 10V), a source power from the customer-side power-supply circuit UP13 (for example, a power including a voltage of 15V), and a source power from the customer-side power-supply circuit UP14 (for example, a power including a voltage of −15V).

In the fundamental form, as shown in FIG. 3, the gate power supplies (BP1 to BP6) of IGBTs of respective phases, the power supplies used by the customers and the like are provided by a single large power supply transformer T1.

On the other hand, in the present embodiment, the power supplies used by the customers can be separated by dividing the power supply transformer into two transformers that are the first-stage power supply transformer T101 and the second-stage power supply transformer T102, as shown in FIG. 1. Whit this configuration, the following advantageous effects can be obtained.

i) By providing a duplexed form of power supply transformer, the windings in the power supply transformer T101 of the first stage are reduced, so that a winding space of the power supply transformer T101 becomes broadened. This realizes a winding structure having a noise reduction effect.

ii) By separating the power supplies to be used by the customers, an insulation distance of the power supply transformer T101 of the first stage is reduced, by which the space is further broadened. That is, because the customer-side power supplies are handled by users, a greater isolation distance (reinforced isolation) is needed and, when the number of customer-side power-supply windings is reduced, the isolation distance is reduced.

iii) Noise paths can be unified to the customer-side power-supply winding P3', and by interposing the power supply transformers T101 and T102 in a duplexed manner in the path, a noise reduction effect can be achieved.

iv) In a general-purpose inverter that has recently become highly functional, the number of power supplies needed by the customers is increased. By providing the two power supply transformers in a duplexed manner, necessary power supplies can be freely added without increasing the noise.

Using the space generated by provision of the two power supply transformers, the winding structure having a noise reduction effect is obtained as shown in FIG. 2.

First, by winding the customer-side power-supply winding P3' next to the primary winding P1', the upper gate windings BP1 to BP3 that are the largest noise sources can be kept farthest away from the customer-side power-supply winding P3'. At that time, no matter how much the customer-side power supplies are increased, the customer-side powers can be supplied by the single customer-side power-supply winding P3' in the present system, and therefore the whole customer-side power-supply winding P3' can be arranged next to the primary winding P1.

However, when the whole customer-side power-supply winding P3' are arranged next to the primary winding P1, it implies that they are near a switching noise source of the control power supply (a place indicated by a dashed circle in FIG. 5). Therefore, as shown in FIG. 2, a winding start position of the primary winding P1' in the power supply transformer T101 of the first stage is matched with a position of a winding in which a voltage is fluctuated due to a switching element and is set to the innermost core side. With this configuration, the switching noise source of the control power supply (the place indicated by the dashed circle in FIG. 5) can be kept away from the customer-side power-supply winding P3'. When the number of layers in the primary winding P1' in the power supply transformer T101 of the first stage increases, the effect obtained therefrom is increased. In FIG. 2, a case where the number of the layers in the primary winding P1' in the power supply transformer T101 of the first stage is four is shown as an example.

The upper gate windings BP1 to BP3, which are the noise sources, are then wound on the outermost core side to keep the upper gate windings BP1 to BP3 away from the customer-side power-supply winding P3'.

At that time, no matter how much the customer-side power supplies are increased, there is no need for increasing the number of the windings in the power supply transformer T101 of the first stage in the present system, and therefore a degradation of the coupling with the primary winding P1' (voltage drop) due to a thickly wound form can be suppressed and the upper gate windings BP1 to BP3 can be easily placed on the outermost core layer.

Furthermore, by winding the upper gate windings BP1 to BP3 that are the noise sources and the lower gate windings BP4 to BP6 connected to a GND side (N side) of the inverter to have the same height in an axial direction (to be aligned in the radial direction), it is possible to form a shield of a propagation path based on the lower gate windings of the GND side (N side) (a place indicated by a double-dot dashed line in FIG. 2), and effectively suppress propagation of the noise.

In the fundamental form, because the number of the windings is too large as shown in FIG. 3 and so it is difficult to wind the upper gate windings BP1 to BP3 and the lower gate windings BP4 to BP6 to have the same height in an axial direction as shown in FIG. 5, a method of winding wires in such a manner that height positions of the layers are alternated is adopted. For example, in this method, there are no shielding means between the upper gate winding BP3 and the customer-side power-supply windings P3 to P5, and as indicated by arrows of a dot dashed line in FIG. 5, the noise is easily propagated from the upper gate winding BP3 to the customer-side power-supply windings P3 to P5. Even if the upper gate windings BP1 to BP3 and the lower gate windings BP4 to BP6 are reversed, a shield effect by the lower gate windings BP4 to BP6 is likely to be reduced, so that the noise is easily propagated from the upper gate windings BP1 to BP3 to the customer-side power-supply windings P3 to P5. When the number of windings is large, a method of arranging different windings on the same layer can be employed, but the shield effect is degraded and the distance to the customer-side power-supply winding P3' is shortened, so that the noise reduction effect tends to be lost.

In the present embodiment, the space is secured in the power supply transformer T101 of the first stage by provision of the two power supply transformers T101 and T102, as shown in FIG. 1. Therefore, it is possible to obtain the winding structure as shown in FIG. 2 in which the lower gate windings BP4 to BP6 can effectively shield the propagation of the noise from the upper gate windings BP1 to BP3 to the customer-side power-supply winding P3' in the power supply transformer T101 of the first stage.

Next, the fundamental form and the present embodiment are compared with each other.

In the fundamental form, because the number of required windings (types of power supplies) in the control power supply is large as shown in FIG. 3 (for example, six sets of windings for driving the IGBTs, windings for 24V, ±10V, 5V, 3.3V, etc.), a thickly wound form or insufficiency of winding is likely to occur. Therefore, in the power supply transformer T1, it is difficult to wind the windings to have the same height in an axial direction (to be aligned along the radial direction) to effectively use the space, as shown in FIG. 5.

On the other hand, in the present embodiment, by providing the twin power supply transformers, the number of customer-side power-supply windings P3' can be reduced to one as shown in FIG. 1, and therefore it is possible to reduce the number of windings required for one power supply transformer. As a result, the space can be reserved in the power supply transformer T101 of the first stage, and the upper gate windings BP1 to BP3 and the lower gate windings BP4 to BP6 can be easily wound to have the same height in an axial direction (to be aligned along the radial direction).

In the fundamental form, one of the reasons why it is difficult to wind the upper gate windings BP1 to BP3, which are the noise sources, on the outermost core layer is because many windings are required and accordingly the coupling with the primary winding is likely to be degraded (a voltage is likely to be dropped) due to a thickly wound form, so that it is difficult to place the U/V/W-phase upper gate windings, which are important for the inverter, on the outermost core layer.

On the other hand, in the present embodiment, by providing the twin power supply transformers, the number of customer-side power-supply windings P3' can be reduced to one as shown in FIG. 1, and therefore it is possible to reduce the number of windings required for one power supply transformer. As a result, the degradation of the coupling with the primary winding due to a thickly wound form can be suppressed.

In the fundamental form, one of the reasons why it is difficult to wind the customer-side power-supply windings to be connected to the customer-side power-supply circuits used to operate the user devices on the innermost side layer (next to the primary winding) is because the number of power supplies (for 24V, 5V, ±10V, etc.) to be connected to the customer-side power-supply circuits is large so that it is difficult to wind all the windings on the inner side layer.

On the other hand, in the present embodiment, by providing the twin power supply transformers, the power supplies (for 24V, 5V, ±10V, etc.) to be connected to the customer-side power-supply circuits are formed in the power supply transformer T102 of the second stage, and therefore all the customer-side power-supply windings P3' can be easily wound on the innermost side layer (next to the primary winding) in the power supply transformer T101 of the first stage.

In the fundamental form, in the power supply transformer T1, the place of the winding start of the primary winding P1 is adjacent to the customer-side power-supply windings P3 to P5 as indicated by the dashed circle in FIG. 5, and therefore the switching noise of the control power supply may be propagated to the customer-side power-supply circuits UP1 to UP3 via the customer-side power-supply windings P3 to P5 as indicated by a dashed line in FIG. 3.

On the other hand, in the present embodiment, the place of the winding start of the primary winding P1' is kept away from the customer-side power-supply winding P3' as indicated by the dashed circle in FIG. 2, and therefore the switching noise of the control power supply is less easily propagated to the customer-side power-supply winding P3'.

As described above, in the power supply device 100 according to the embodiment, the twin power supply transformers T101 and T102 are provided, and therefore the number of customer-side power-supply windings in the plural secondary windings P3' and BP1 to BP6 of the power supply transformer T101 of the first stage can be reduced to one. Furthermore, in the plural secondary windings P3' and BP1 to BP6 of the power supply transformer T101 of the first stage, the upper gate windings BP1 to BP3 are wound on the outermost side to be kept away from the customer-side power-supply winding P3'. Accordingly, in the winding structure of the power supply transformer T101 of the first stage, the customer-side power-supply winding P3' and the upper gate windings BP1 to BP3 can be easily placed distant from each other, so that the switching noise of the inverter INV is less easily transferred from the upper gate windings BP1 to BP3 to the customer-side power-supply winding P3', thereby preventing the switching noise from being easily transferred to the customer-side power-supply circuits UP11 to UP14 via the customer-side power-supply winding P3'. Therefore, it is possible to suppress transfer of the switching noise caused by the switching elements Uu, Vu and Wu of the upper arm of the inverter INV to the customer-side power-supply circuits UP11 to UP14, and as a result, malfunction of one or plural user devices operated using the customer-side power-supply circuits UP11 to UP14 can be reduced.

Furthermore, in the embodiment, among the secondary windings P3' and BP1 to BP6 of the power supply transformer T101 of the first stage, the single customer-side power-supply winding P3' is wound on the innermost side. With this configuration, the customer-side power-supply winding P3' and the upper gate windings BP1 to BP3 can be placed distant from each other in an effective manner.

Moreover, in the embodiment, in the secondary windings P3' and BP1 to BP6 of the power supply transformer T101 of the first stage, the lower gate windings BP4 to BP6 are wound between the upper gate windings BP1 to BP3 and the single customer-side power-supply winding P3' to have substantially the same height in the axial direction as that of the upper gate windings BP1 to BP3. With this configuration, it is possible to cause the lower gate windings BP4 to BP6 to function as a shield for suppressing the propagation of the noise from the upper gate windings BP1 to BP3 to the single customer-side power-supply winding P3', and as a result, the propagation of the noise from the upper gate windings BP1 to BP3 to the single customer-side power-supply winding P3' can be effectively suppressed.

In addition, in the embodiment, in the primary winding P1' of the power supply transformer T101 of the first stage, a plurality of layers are wound in such a manner that a winding start layer among the layers is placed on the innermost side. With this configuration, the switching noise source of the control power supply (the place indicated by the dashed circle in FIG. 2) can be kept away from the single customer-side power-supply winding P3', so that the switching noise of the control power supply is less easily transferred from the primary winding P1' to the customer-side power-supply winding P3', whereby the switching noise of the control power supply can be prevented from being easily transferred to the customer-side power-supply circuits UP11 to UP14 via the customer-side power-supply winding P3'. Therefore, transfer of the switching noise caused by the transistor TR of the input circuit 2 to the customer-side power-supply circuits UP11 to UP14 can be suppressed, and as a result, malfunction of one or plural user devices operated with the customer-side power-supply circuits UP11 to UP14 can be reduced.

INDUSTRIAL APPLICABILITY

As described above, the power supply device according to the present invention is useful for supplying gate powers of an inverter.

REFERENCE SIGNS LIST 1 power supply device
2 input circuit
3-1 to 3-3 output circuit
4-1 to 4-6 output circuit
100 power supply device
103-1 to 103-4 output circuit
105 relay circuit
BP1 to BP3 upper gate winding
BP4 to BP6 lower gate winding
GP1 to GP3 upper-gate power-supply circuit
GP4 to GP6 lower-gate power-supply circuit
P1, P1' primary winding
P2 control winding
P3 to P5, P3', BP1 to BP6 secondary winding T1, T101, T102 power supply transformer
UP1 to UP3, UP11 to UP14 customer-side power-supply circuit

The invention claimed is:

1. A power supply device that generates source powers to be outputted to an inverter and a plurality of external supply destinations, the power supply device comprising:
    a first power supply transformer including a first primary winding and a plurality of first secondary windings wound on an outer side of the first primary winding; and
    a second power supply transformer including a second primary winding electrically connected to one of the first secondary windings and a plurality of second secondary windings wound on an outer side of the second primary winding, wherein
    the second secondary windings are connected to the external supply destinations, and
    the first secondary windings include an upper gate winding connected to an upper-gate power supply circuit for switching on and off a switching element of an upper arm of the inverter, the upper gate winding being wound on an outermost side to be separated away from the one of the first secondary windings.

2. The power supply device according to claim 1, wherein in the first secondary windings, the one of the first secondary windings is wound on an innermost side.

3. The power supply device according to claim 1, wherein, in the first primary winding, a plurality of layers are wound in such a manner that a winding start layer of the layers is located on an innermost side.

4. The power supply device according to claim 1, wherein the first secondary windings include a lower gate winding connected to a lower gate power supply circuit for switching on and off a switching element of a lower arm of the inverter, the lower gate winding being wound between the upper gate winding and the one of the first secondary windings to have substantially the same height in an axial direction as that of the upper gate winding.

* * * * *